United States Patent
Takahashi

(10) Patent No.: US 9,073,431 B2
(45) Date of Patent: Jul. 7, 2015

(54) VEHICLE CONTROL SYSTEM

(71) Applicant: HONDA MOTOR CO., LTD., Tokyo (JP)

(72) Inventor: Akio Takahashi, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/230,179

(22) Filed: Mar. 31, 2014

(65) Prior Publication Data

US 2014/0297061 A1 Oct. 2, 2014

(30) Foreign Application Priority Data

Apr. 2, 2013 (JP) ................................. 2013-077068

(51) Int. Cl.
*G05D 1/00* (2006.01)
*B60K 28/06* (2006.01)

(52) U.S. Cl.
CPC ............... *B60K 28/06* (2013.01); *B60K 28/063* (2013.01); *B60W 2540/24* (2013.01)

(58) Field of Classification Search
CPC ....................... B60K 28/02; B60W 2040/0836
USPC .......................................................... 701/1
See application file for complete search history.

(56) References Cited

U.S. PATENT DOCUMENTS

| | | | |
|---|---|---|---|
| 3,764,270 A | 10/1973 | Collier et al. | |
| 4,093,945 A | 6/1978 | Collier et al. | |
| 2003/0006644 A1* | 1/2003 | MacGregor et al. | 303/3 |
| 2010/0043524 A1* | 2/2010 | Takata | 73/23.3 |
| 2010/0312431 A1 | 12/2010 | Kaschner | |
| 2010/0314190 A1 | 12/2010 | Zimmermann et al. | |

FOREIGN PATENT DOCUMENTS

| | | |
|---|---|---|
| DE | 907981 | 1/1955 |
| DE | 22 64 839 | 5/1975 |
| DE | 10 2007 044 692 | 5/2008 |
| DE | 10 2007 047 709 | 4/2009 |
| EP | 2 263 904 | 12/2010 |
| JP | 2008-204213 | 9/2008 |
| JP | 2009-001101 | 1/2009 |
| JP | 2009-202655 | 9/2009 |
| JP | 2011-073503 | 4/2011 |

OTHER PUBLICATIONS

German Search Report dated Jul. 29, 2014, Application No. 10 2014 205 721.3; English translation included.
Japanese Office Action with English Translation, dated Feb. 24, 2015, 6 pages.
German Office Action with English Translation, dated Mar. 10, 2015, 14 pages.

* cited by examiner

*Primary Examiner* — James Trammell
*Assistant Examiner* — Michael D Lang
(74) *Attorney, Agent, or Firm* — Rankin, Hill & Clark LLP

(57) ABSTRACT

A vehicle control system includes an alcohol detector which detects an alcohol intake level of a driver of a vehicle; and a controller which determines whether the driver is a drunk person based on a detection result obtained from the alcohol detector, and which stops the vehicle when a determination result that the driver is the drunk person is obtained. After a door of the vehicle is switched from a closed state to an open state, and before an operation of a start-up of the vehicle is performed, the controller controls the alcohol detector so that a detection of the alcohol intake level is started, and allows a travelling of the vehicle before the detection result is output from the alcohol detector.

2 Claims, 2 Drawing Sheets

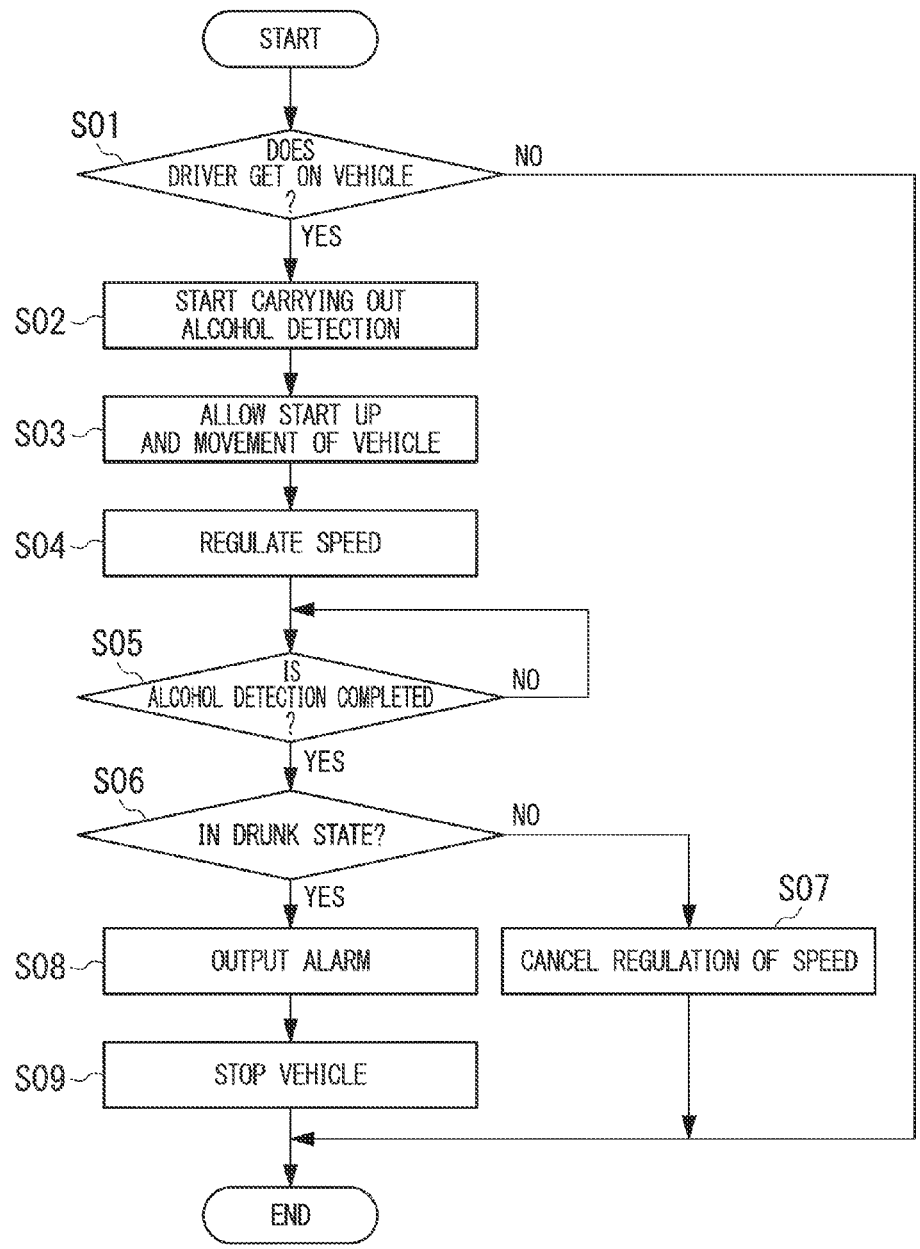

VEHICLE CONTROL SYSTEM

CROSS-REFERENCE TO RELATED APPLICATION

Priority is claimed on Japanese Patent Application No. 2013-077068, filed on Apr. 2, 2013, the content of which is incorporated herein by reference.

BACKGROUND

1. Field of the Invention

The present invention relates to a vehicle control system.

2. Description of Related Art

In the related art, in order to prevent a drunk person from driving a vehicle, there is known a system that allows an engine start-up when the system determines that a driver of the vehicle is not a drunk person based on an alcohol detection result obtained from an alcohol detector provided in the vehicle.

In the system, even if a target person for an alcohol detection has no intention to drive the vehicle, in order to start up an engine of the vehicle, it is necessary to carry out the alcohol detection expressly.

As described above, in order to reduce botheration of the alcohol detection at the time of the start-up of the engine, there is known a system that allows the start-up of the engine and prohibits the vehicle from moving regardless of a result of an alcohol detection (that is, regardless of whether the alcohol detection is carried out), when an operation device requiring engine idling is operated (for an example, refer to Japanese Unexamined Patent Application, First Publication No. 2009-1101).

SUMMARY

Incidentally, according to the system in the related art, in a case where the target person for the alcohol detection is a non-drunk person and has an intention to drive the vehicle, it is necessary for the target person to operate an alcohol detection switch initially in order to start the alcohol detection. Therefore, there is a problem in that the operation at the time of the start-up of the vehicle becomes complicated. Furthermore, there is a problem in that even after the alcohol detection is carried out and the alcohol detection result is output, there is a predetermined waiting period before the vehicle can be driven.

Aspects according to the present invention is made in consideration of the aforementioned problems, and an object of the present invention is to provide a vehicle control system capable of ensuring a desired convenience and appropriately preventing a drunk person from driving a vehicle.

An aspect according to the present invention includes the following measures for achieving the object related to solving the problem.

(1) A vehicle control system according to an aspect of the present invention includes: an alcohol detector which detects an alcohol intake level of a driver of a vehicle; and a controller which determines whether the driver is a drunk person based on a detection result obtained from the alcohol detector, and which stops the vehicle when a determination result that the driver is the drunk person is obtained. After a door of the vehicle is switched from a closed state to an open state, and before an operation of a start-up of the vehicle is performed, the controller controls the alcohol detector so that a detection of the alcohol intake level is started, and allows a travelling of the vehicle before the detection result is output from the alcohol detector.

(2) In the aspect of (1), the controller may regulate a speed of the vehicle to a predetermined speed or less until a determination result indicating whether the driver is a drunk person is obtained.

(3) The aspect of (2) may further include a reporting device that is controllable by the controller. When the controller controls the alcohol detector so that the detection of the alcohol intake level is started, the controller may control the reporting device so that at least one of a first information and a second information is reported to the driver. The first information indicates that "the vehicle stops within a predetermined time in a case where the determination result that the driver is the drunk person is obtained", and the second information indicates that "the speed of the vehicle is regulated to the predetermined speed or less until the determination result indicating whether the driver is a drunk person is obtained".

According to the aspect of (1), it is possible to move the vehicle without a waiting period from the start of the detection of the alcohol intake level by the alcohol detector to the end of the output of the detection result. Therefore, it is possible to ensure convenience equivalent to that of a vehicle which has no alcohol detector, and to appropriately prevent a drunk person from driving the vehicle.

In addition, according to the aspect of (2), since a speed of the vehicle is regulated to a predetermined speed or less until a determination result indicating whether the driver is a drunk person is obtained, it is possible to ensure a desired level of safe driving even if the driver is a drunk person.

Furthermore, according to the aspect of (3), when the detection of the alcohol intake level is started, at least one of the first information and the second information is reported to the driver. Therefore, it is possible to reduce a drunk person's motivation to drive, and to prevent the drunk person from driving the vehicle.

BRIEF DESCRIPTION OF THE DRAWINGS

FIG. 3 is a flow chart illustrating an operation of the vehicle control system according to the embodiment of the present invention.

DESCRIPTION OF THE EMBODIMENT

Hereinafter, a vehicle control system according to an embodiment of the present invention will be described with reference to the accompanying drawings.

Figure 1:
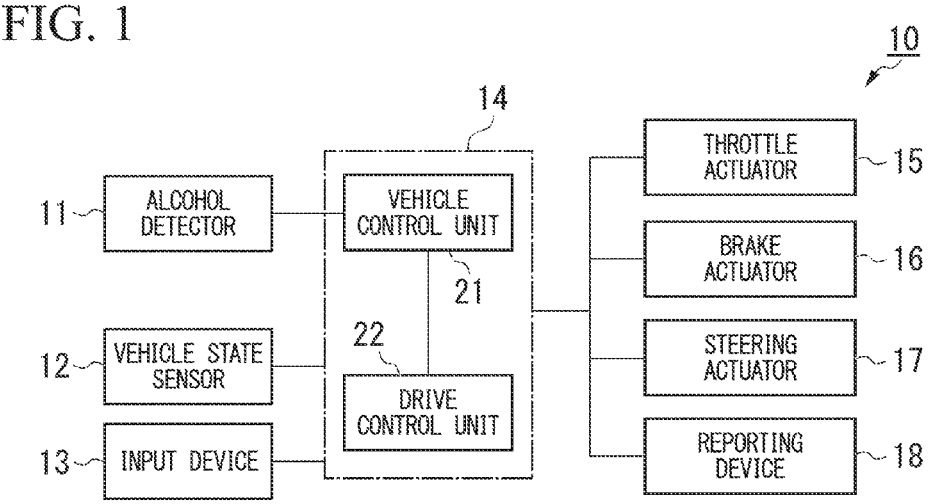
FIG. 1 is a configuration view of a vehicle control system according to an embodiment of the present invention.

As illustrated in FIG. 1, a vehicle control system 10 according to the embodiment includes an alcohol detector 11, a vehicle state sensor 12, an input device 13, a controller 14, a throttle actuator 15, a brake actuator 16, a steering actuator 17, and a reporting device 18.

Figure 2:
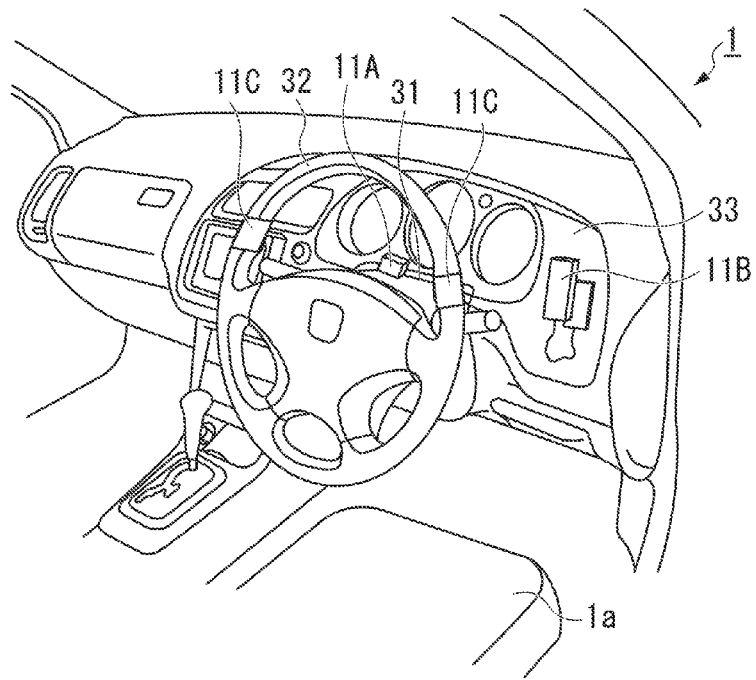
FIG. 2 is a view illustrating dispositions of alcohol sensors included in an alcohol detector of the vehicle control system according to the embodiment of the present invention.

As illustrated in FIG. 2, for example, the alcohol detector 11 is disposed in the vicinity of a driver seat 1a of a vehicle 1. For example, the alcohol detector 11 includes a breathalyzer type alcohol sensor 11A that is provided on an upper surface of a steering column cover 31, a breathalyzer type alcohol sensor 11B that is disposed on an instrument panel 33 farther outside than a steering wheel 32 in a width direction of the vehicle 1, and two touch type alcohol sensors 11C that are provided on the steering wheel 32.

Each of the breathalyzer type alcohol sensors 11A and 11B detects an alcohol density in an exhalation of a driver of the vehicle 1 as an alcohol intake level of the driver, and outputs a signal indicating a detection result of the alcohol density to the controller 14.

Each of the touch type alcohol sensors 11C detects the alcohol density in the sweat secreted from surfaces of the palm or the fingers of the driver, or in the subcutaneous tissues of the driver as the alcohol intake level, and outputs the signal indicating the detection result of the alcohol density to the controller 14.

The vehicle state sensor 12 detects various vehicle information of the vehicle 1, and outputs signals indicating the detected vehicle information to the controller 14.

The vehicle state sensor 12 includes a wheel speed sensor that detects the rotational speed (wheel speed) of a drive wheel of the vehicle 1; an acceleration sensor that detects the acceleration acting on a vehicle 1; a gyro sensor that detects the posture or the direction of progress of the vehicle 1; and a yaw rate sensor that detects the yaw rate (rotational angular speed around a vertical axis of the center of gravity of the vehicle) of the vehicle 1.

The vehicle state sensor 12 further includes a receiver that receives a positioning signal from a positioning system (for example, global positioning system: GPS, global navigation satellite system: GNSS or the like) used to measure the position of a host vehicle by means of artificial satellites. The vehicle state sensor 12 detects the current position of the vehicle 1 based on the positioning signal. Furthermore, by using a result of an arithmetic processing of an autonomous navigation using the yaw rate and the speed of the vehicle 1 which is calculated based on the wheel speed, it is possible to detect the current position of the vehicle 1 with higher accuracy.

In addition, the vehicle state sensor 12 further includes a sensor that outputs a signal corresponding to a closed state and an open state of a door of the vehicle 1 to the controller 14.

The input device 13 outputs various signals corresponding to input operations of an operator (for example, the driver) to the controller 14.

The controller 14 recognizes a drunk state of the driver, states of the vehicle 1, and driving operations of the driver based on various signals input from the alcohol detector 11 (alcohol sensors 11A, 11B, and 11C), the vehicle state sensor 12, and the input device 13, and controls the whole operation of the vehicle 1 based on those recognition results.

Specifically, the controller 14 includes a vehicle control unit 21 and a drive control unit 22. The vehicle control unit 21 recognizes the drunk state of the driver, the states of the vehicle 1, and the driving operations of the driver based on the various input signals, and controls the drive control unit 22 based on those recognition results so that the vehicle 1 runs appropriately. In addition, the vehicle control unit 21 controls the reporting device 18 so as to report necessary information to the driver.

The drive unit 22 performs the running control (for example, the speed control, the braking control, the steering angle control, and the like) of the vehicle 1 by controlling the throttle actuator 15, the brake actuator 16, and the steering actuator 17 according to the control of the vehicle control unit 21.

The vehicle control unit 21 determines whether the driver is a drunk person based on the signal which is input from the alcohol detector 11 and indicates the detection result of the alcohol density. For example, when the alcohol density is greater than or equal to a predetermined value, the vehicle control unit 21 determines that the driver is a drunk person.

In a case where the vehicle control unit 21 determines that the driver is a drunk person, if the vehicle 1 is running, the vehicle control unit 21 controls the reporting device 18 so as to output an alarm, and controls the drive control unit 22 so that the vehicle 1 automatically slows down and stops.

In addition, the vehicle control unit 21 stops a driving source (for example, internal combustion engine or the like) of the vehicle 1 when the state of the vehicle 1 satisfies a predetermined condition.

In contrast, in a case where the vehicle control unit 21 determines that the driver is not a drunk person during a run of the vehicle 1, the vehicle control unit 21 allows the vehicle 1 to be driven continuously.

After the door of the vehicle 1 is switched from the closed state to the open state during a stop of the vehicle 1, and before an operation of a start-up of the vehicle 1 is performed, the vehicle control unit 21 controls the alcohol detector 11 so that an alcohol detection (that is, a detection of the alcohol density) is started, and allows a travelling of the vehicle 1 before the detection result of the alcohol density is output from the alcohol detector 11.

In addition, after the vehicle control unit 21 starts the alcohol detection by the alcohol detector 11, and allows the travelling of the vehicle 1, the vehicle control unit 21 controls the drive control unit 22 to regulate the speed of the vehicle 1 to a predetermined speed or less (for example, 15 km/h or the like) until a determination result indicating whether the driver is a drunk person is obtained.

In addition, when the vehicle control unit 21 controls the alcohol detector 11 so that the alcohol detection is started, the vehicle control unit 21 controls the reporting device 18 so that a first information indicating that "the vehicle 1 stops within a predetermined time in a case where the determination result that the driver is the drunk person is obtained" is reported to the driver.

Furthermore, when the vehicle control unit 21 controls the alcohol detector 11 so that the alcohol detection is started, the vehicle control unit 21 controls the reporting device 18 so that a second information indicating that "the speed of the vehicle 1 is regulated to the predetermined speed or less until the determination result indicating whether the driver is a drunk person is obtained" is reported to the driver. In addition, at least one of the first information and the second information may be reported to the driver.

In a case where the vehicle control unit 21 determines that the driver is a drunk person, even if an acceleration pedal of the vehicle 1 is stepped, the drive control unit 22 forcibly slows down and stops the vehicle 1 by controlling the throttle actuator 15 and the brake actuator 16.

For example, the reporting device 18 includes a tactual transmission device, a visual transmission device, and an aural transmission device.

For example, the tactual transmission device is a seat belt device, a steering control device, or the like, and based on a control signal input from the vehicle control unit 21, the tactual transmission device generates a predetermined tensile force to exert a tightening force on a seat belt which the driver of the vehicle 1 can tactually perceive, or generates vibration (steering wheel vibration) of the steering wheel 32 which the driver can tactually perceive.

For example, the visual transmission device is a display device or the like, and based on a control signal input from the vehicle control unit 21, the visual transmission device displays predetermined alarm information on the display device, or blinks a predetermined alarm lamp.

For example, the aural transmission device is a speaker or the like, and based on a control signal input from the vehicle control unit 21, the aural transmission device outputs a predetermined alarm sound, a voice, or the like.

The vehicle control system 10 according to the embodiment has the configuration. Subsequently, an operation of the vehicle control system 10 will be described.

FIG. 3 is a flow chart showing a drunk driving prevention process carried out by the controller 14 (mainly vehicle control unit 21).

For example, the drunk driving prevention process illustrated in FIG. 3 is repeatedly carried out at a predetermined interval.

As shown in FIG. 3, first, in step S01 of the drunk driving prevention process, the vehicle control unit 21 determines whether the driver gets on the vehicle 1 by determining whether the door on the side of the driver seat 1a is switched from the closed state to the open state during the stop of the vehicle 1.

In step S01, when the vehicle control unit 21 determines that the driver does not get on the vehicle 1, that is, when the determination result of step S01 is "NO", the vehicle control unit 21 ends the current drunk driving prevention process.

In contrast, in step S01, when the vehicle control unit 21 determines that the driver gets on the vehicle 1, that is, when the determination result of step S01 is "YES", the vehicle control unit 21 proceeds to next step S02.

In step S02, the vehicle control unit 21 controls the alcohol detector 11 so that an alcohol detection is started. In addition, the vehicle control unit 21 controls the reporting device 18 so that the first information and the second information are reported to the driver.

In next step S03, the vehicle control unit 21 allows the start-up and the travelling of the vehicle 1.

In next step S04, the vehicle control unit 21 controls the drive control unit 22 so that the speed of the vehicle 1 is regulated to a predetermined speed or less (for example, 15 km/h or the like).

In next step S05, the vehicle control unit 21 determines whether the alcohol detection by the alcohol detector 11 is completed.

In step S05, when the vehicle control unit 21 determines that the alcohol detection by the alcohol detector 11 is not completed, that is, when the determination result of step S05 is "No", the vehicle control unit 21 repeatedly carries out the determination process of step S05.

In contrast, in step S05, when the vehicle control unit 21 determines that the alcohol detection by the alcohol detector 11 is completed, that is, when the determination result of step S05 is "YES", the vehicle control unit 21 proceeds to step S06.

In step S06, the vehicle control unit 21 determines whether the driver is a drunk person based on a detection result of the alcohol density obtained from the alcohol detector 11.

In step S06, when the vehicle control unit 21 determines that the driver is not a drunk person, that is, when the determination result of step S06 is "NO", the vehicle control unit 21 proceeds to step S07.

In step S07, the vehicle control unit 21 controls the drive control unit 22 so as to cancel the speed regulation of the vehicle 1, and then ends the current drunk driving prevention process.

In contrast, in step S06 described above, when the vehicle control unit 21 determines that the driver is a drunk person, that is, when the determination result of step S06 is "YES", the vehicle control unit 21 proceeds to step S08.

In step S08, the vehicle control unit 21 controls the reporting device 18 so as to output an alarm which warns that the driver is drunk.

In next step S09, the vehicle control unit 21 controls the drive control unit 22 so that the vehicle 1 automatically slows down and stops. Then, the vehicle control unit 21 ends the current drunk driving prevention process after the vehicle control unit 21 stops the driving source (for example, engine or the like) of the vehicle 1 if necessary.

As described above, according to the vehicle control system 10 of the embodiment, it is possible to move the vehicle 1 without a waiting period from the start of the alcohol detection by the alcohol detector 11 to the end of the output of the detection result. Therefore, it is possible to ensure convenience equivalent to that of a vehicle which has no alcohol detector 11, and to appropriately prevent a drunk person from driving the vehicle 1.

In addition, after the alcohol detection by the alcohol detector 11 is started, since the speed of the vehicle 1 is regulated to the predetermined speed or less until the determination result indicating whether the driver is a drunk person is obtained, it is possible to ensure a desired level of safe driving even if the driver is a drunk person.

Furthermore, when the alcohol detection by the alcohol detector 11 is started, the first information (that is, the information indicating that "the vehicle 1 stops within a predetermined time in a case where the determination result that the driver is the drunk person is obtained") and the second information (that is, the information indicating that "the speed of the vehicle 1 is regulated to the predetermined speed or less until the determination result indicating whether the driver is a drunk person is obtained") are reported to the driver. Therefore, it is possible to reduce a drunk person's motivation to drive, and to prevent the drunk person from driving the vehicle.

In the embodiment, in the processes of step S01 to step S09, when the driver gets on the vehicle 1, the alcohol detection by the alcohol detector 11 is automatically started. However, the present invention is not limited to the embodiment. For example, in a case where the vehicle 1 is equipped with only the alcohol detector 11 that requires the test target person to carry out a predetermined active operation (breath blowing operation or the like), for example, a blow of the breathalyzer type alcohol sensor 11B or the like, the system reports to the driver that the driver is encouraged to carry out the predetermined operation, and after the driver starts carrying out the predetermined operation in response to the report, the vehicle 1 may be allowed to start up and move.

In addition, in the embodiment, the breathalyzer type alcohol sensors 11A and 11B, and the touch type alcohol sensors 11C are exemplified. However, it is possible to use any kind of alcohol sensors capable of detecting the alcohol intake level of the driver.

The embodiment is proposed as an example, and is not intended to limit the scope of the present invention. New embodiments can be put into practice in other various forms, and various omissions, replacements, and modifications can be made to the embodiment as long as there is no departure from the idea of the present invention. The embodiment or the modification thereof is included in the scope or the idea of the present invention, and is included in the scopes of the claims of the present invention and the equivalents thereof.

What is claimed is:

1. A vehicle control system comprising:
an alcohol detector which detects an alcohol intake level of a driver of a vehicle; and a controller which determines whether the driver is a drunk person based on a detection result obtained from the alcohol detector, and which stops the vehicle when a determination result that the driver is the drunk person is obtained, wherein after a door of the vehicle is switched from a closed state to an open state, and before an operation of a start-up of the vehicle is performed, the controller controls the alcohol detector so that a detection of the alcohol intake level is started, and allows a travelling of the vehicle before the detection result is output from the alcohol detector, the controller regulates a speed of the vehicle to a predetermined speed or less until a determination result indicating whether the driver is a drunk person is obtained, and the controller cancels the speed regulation of the vehicle when the controller determines that the driver is not a drunk person.

2. The vehicle control system according to claim 1, further comprising:

a reporting device that is controllable by the controller, wherein when the controller controls the alcohol detector so that the detection of the alcohol intake level is started, the controller controls the reporting device so that at least one of a first information and a second information is reported to the driver, the first information indicating that the vehicle stops within a predetermined time in a case where the determination result that the driver is the drunk person is obtained, and the second information indicating that the speed of the vehicle is regulated to the predetermined speed or less until the determination result indicating whether the driver is a drunk person is obtained.

* * * * *